3,093,725
ARC WELDING METHOD
Edward R. Gamberg, Clarence, and Stephen A. Yaczko, Clarence Center, N.Y., and George H. Cotter, Monroeville, Pa., assignors to Westinghouse Electric Corporation, East Pittsburgh, Pa., a corporation of Pennsylvania
Filed May 23, 1961, Ser. No. 112,069
1 Claim. (Cl. 219—74)

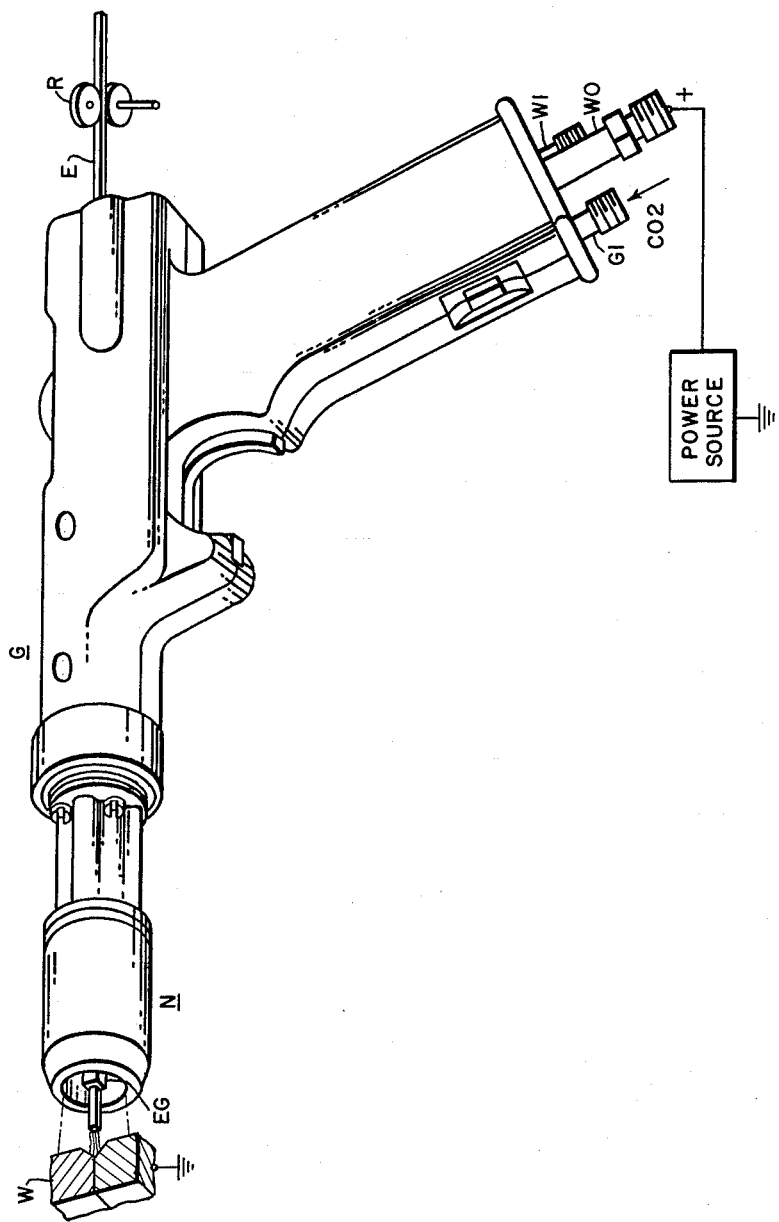

This invention relates to the art of arc welding and has particular relationship to arc welding with a consumable electrode in a shield or atmosphere of protective gas. Broadly the protective gas may be inert or reactive but in accordance with one of its specific but highly important aspects this invention concerns itself with welding with a consumable electrode in a shield of carbon dioxide or which consists primarily of carbon dioxide.

In accordance with the teachings of the prior art welding in a shield of carbon dioxide is carried out with an electrode of generally circular section. The electrode is preferably advanced towards the work through the nozzle of a welding gun through or adjacent to which the shielding carbon dioxide is also advanced. An arc is fired between the tip of the electrode which projects through the nozzle and the work and the electrode is advanced into the arc and is melted to produce the weld as it is advanced.

In welding in accordance with the teachings of the prior art as just described a high, narrow bead having deep penetration in the work but having inadequate surface coverage is produced. Such a bead is generally undesirable and is particularly objectionable in the welding of lap or fillet joints.

It is then an object of this invention to provide arc welding apparatus and a method of arc welding in the use and practice of which a wide bead shall be produced.

Another object of this invention is to widen the beads produced by welding with a consumable electrode in a predominately carbon dioxide protective atmosphere.

In accordance with this invention the desired widening of the bead is achieved by welding in the carbon dioxide shield with a consumable electrode of generally rectangular section.

The novel features considered characteristic of this invention are disclosed generally above. The invention both as to its organization and as to its method of operation together with additional objects and advantages thereof will be better understood from the following description of a specific embodiment taken in connection with the accompanying drawing, the single FIGURE of which shows apparatus in accordance with this invention and for practicing this invention.

The apparatus shown in the drawing includes a welding gun G which may be similar to the gun shown in Miller Patent 2,806,125. This gun includes an electrode channel (not shown in detail) terminating in a nozzle N and including an electrode guide tube EG preferably of generally rectangular section through which an electrode E is advanced to the work W by drive rolls R. The electrode E is of generally rectangular cross section as shown. Cooling fluid is circulated through the nozzle N through inlet conductor WI and outlet conductor WO. Carbon dioxide for shielding is conducting through inlet conductor GI and passes through the nozzle N around the electrode E.

Power is supplied between the electrode E from a source the hot terminal of which is connected to the outlet conductor WO and the other terminal of which is grounded. The conductor WO is connected to the electrode guide EG through the manifold (not shown) through which the water flows. The guide EG is connected to the electrode E.

In the use of the apparatus, carbon dioxide for shielding is supplied through the conductor GI and cooling fluid through the conductors WI and WO. An arc is fired between the tip of the electrode E as it emerges from the nozzle N and the work W and the electrode E is fed into the arc by the rollers R and melted as it is fed. Because the electrode E is generally rectangular the bead is relatively wide and flat. This unusual result was achieved in the making of a number of welds.

*Example I*

A Westinghouse MS21 electrode of circular cross section and of $\frac{1}{8}''$ diameter was rolled into an electrode of generally rectangular section having cross sectional dimensions of .065″ by .1875. Typically MS21 electrode has the following composition:

| | Percent |
|---|---|
| Carbon | .10 |
| Manganese | 1.0 |
| Silicon | .40 |
| Phosphorous | .003 |
| Sulfur | .002 |
| Iron | Remainder |

This rectangular electrode was used in arc welding AISI 1010 mild steel work in a shield or atmosphere of carbon dioxide. The bead produced was satisfactorily wide and flat.

*Example II*

A Westinghouse MS21 electrode of circular cross section and of .091″ diameter was rolled into an electrode of generally rectangular section having cross sectional dimensions of .052″ by .125″. This electrode when used in the arc welding of AISI 1010 work in a shield of carbon dioxide also produced a satisfactory wide and flat bead.

*Example III*

The electrode of Example II was used in the arc welding of the rear axle of an automobile to the flange in a shield of carbon dioxide and produced a satisfactory joint. The joints which had been produced in attempting to weld in a shield of carbon dioxide with a MS21 electrode of circular section were marginal to poor.

While this invention is of particular importance in its aspect involving welding in a shield of carbon dioxide it appeared desirable to determine the utility of the rectangular electrode in welding in other ways. A submerged-arc weld was produced with a mild steel ribbon of rectangular cross section having cross-sectional dimensions of $1\frac{1}{4}''$ by $\frac{1}{16}''$ and a mild steel work plate $\frac{3}{4}''$ thick. The bead was about $1\frac{1}{2}''$ wide by $\frac{3}{16}''$ deep.

The invention has been disclosed herein as practiced with a gun through which both the electrode and the shielding gas are transmitted. This invention may also be practiced with the electrode transmitted through a gun or torch and the shielding gas supplied from a nozzle adjacent the point where the arc is produced. The invention may also be practiced in a chamber or work box through which the shielding gas may be flowing.

To the extent that this invention is applicable to arc melting in carbon dioxide or otherwise such arc melting is within the scope of this invention.

While preferred embodiments of this invention have been disclosed herein many modifications thereof are feasible. This invention then is not to be restricted except insofar as is necessitated by the spirit of the prior art.

We claim as our invention:

The method of arc welding work with a consumable electrode which comprises firing an arc between said electrode and said work, advancing said electrode into said arc to be progressively melted thereby, and shielding said arc in a shield predominately of carbon dioxide gas, the said method being characterized in that the electrode is of generally rectangular cross-section whereby the weld bead deposited is relatively wide and of moderate penetration.

References Cited in the file of this patent

UNITED STATES PATENTS

| | | |
|---|---|---|
| 2,025,206 | Holslag | Dec. 24, 1935 |
| 2,504,867 | Muller | Apr. 18, 1950 |
| 2,824,948 | Willigen et al. | Feb. 25, 1958 |
| 2,848,593 | Newman et al. | Aug. 19, 1958 |

FOREIGN PATENTS

| | | |
|---|---|---|
| 292,318 | Great Britain | June 21, 1928 |